(12) United States Patent
Fryska et al.

(10) Patent No.: US 7,575,799 B2
(45) Date of Patent: Aug. 18, 2009

(54) CARBON FIBER CONTAINING CERAMIC PARTICLES

(75) Inventors: Slawomir T. Fryska, Granger, IN (US); Mark L. La Forest, Granger, IN (US); Allen H. Simpson, Buchanan, MI (US)

(73) Assignee: Honeywell International Inc., Morris Township, NJ (US)

( * ) Notice: Subject to any disclaimer, the term of this patent is extended or adjusted under 35 U.S.C. 154(b) by 357 days.

(21) Appl. No.: 11/375,119

(22) Filed: Mar. 15, 2006

(65) Prior Publication Data
US 2009/0148699 A1 Jun. 11, 2009

Related U.S. Application Data

(60) Provisional application No. 60/666,637, filed on Mar. 31, 2005, provisional application No. 60/661,945, filed on Mar. 16, 2005.

(51) Int. Cl.
*B32B 17/12* (2006.01)
(52) U.S. Cl. ............ 428/293.4; 428/66.2; 428/408
(58) Field of Classification Search ............ 428/408, 428/299.1, 297.1, 66.2, 293.4; 423/447.1, 423/447.2, 447.3; 188/251 R, 218 XL
See application file for complete search history.

(56) References Cited

U.S. PATENT DOCUMENTS

| | | | | |
|---|---|---|---|---|
| 3,497,318 A * | 2/1970 | Noss ............ 423/447.5 |
| 3,759,353 A | 9/1973 | Marin |
| 3,867,491 A | 2/1975 | Marin |
| 3,932,568 A | 1/1976 | Watts et al. |
| 4,007,814 A | 2/1977 | Berger |
| 4,622,429 A * | 11/1986 | Blank et al. ............ 568/428 |
| 4,778,722 A * | 10/1988 | Yamamura et al. ............ 428/367 |
| 4,815,572 A | 3/1989 | Froberg et al. |
| 4,859,503 A * | 8/1989 | Bouix et al. ............ 427/249.4 |
| 5,007,508 A | 4/1991 | Lacombe |
| 5,030,509 A * | 7/1991 | McCullough et al. ....... 442/117 |
| 5,034,267 A * | 7/1991 | McCullough et al. ....... 442/349 |
| 5,169,718 A * | 12/1992 | Miura et al. ............ 428/408 |
| 5,277,973 A * | 1/1994 | Yamamura et al. ............ 428/367 |
| 5,380,556 A | 1/1995 | Hocquellet et al. |
| 5,383,963 A | 1/1995 | Kobayashi et al. |
| 5,618,875 A * | 4/1997 | Baker et al. ............ 524/495 |
| 5,878,849 A | 3/1999 | Prunier et al. |
| 5,928,785 A * | 7/1999 | Nishida et al. ............ 428/372 |
| 5,957,251 A | 9/1999 | Jones et al. |
| 5,964,320 A | 10/1999 | Kato et al. |
| 6,004,671 A * | 12/1999 | Yamamura et al. ............ 428/364 |
| 6,042,935 A * | 3/2000 | Krenkel et al. ............ 428/307.7 |
| 6,051,167 A * | 4/2000 | Withers et al. ............ 264/29.2 |
| 6,110,268 A | 8/2000 | Gross et al. |
| 6,110,535 A | 8/2000 | Rey et al. |
| 6,261,692 B1 * | 7/2001 | Park et al. ............ 428/408 |
| 6,355,206 B1 | 3/2002 | Hanzawa et al. |
| 6,390,304 B1 | 5/2002 | Wilson et al. |
| 6,458,466 B1 | 10/2002 | Jones et al. |
| 6,703,177 B2 * | 3/2004 | Yamazaki et al. ....... 430/123.41 |
| 6,838,162 B1 * | 1/2005 | Gruber et al. ............ 428/293.4 |
| 6,936,341 B2 * | 8/2005 | Huner et al. ............ 428/293.4 |
| 2003/0057040 A1 | 3/2003 | Bauer et al. |
| 2003/0207749 A1 | 11/2003 | Bauer et al. |
| 2003/0214064 A1 | 11/2003 | Shin et al. |
| 2004/0127600 A1 | 7/2004 | Bauer et al. |
| 2005/0221051 A1 * | 10/2005 | Simpson et al. ............ 428/66.2 |
| 2006/0261504 A1 * | 11/2006 | Simpson et al. ............ 264/29.1 |
| 2007/0144840 A1 * | 6/2007 | Goller et al. ............ 188/218 XL |

FOREIGN PATENT DOCUMENTS

| | | |
|---|---|---|
| EP | 0 404 571 A1 | 12/1990 |
| GB | 1197697 | 7/1970 |
| WO | WO 03/056206 A | 7/2003 |

* cited by examiner

*Primary Examiner*—N. Edwards
(74) *Attorney, Agent, or Firm*—Birch, Stewart, Kolasch & Birch, LLP

(57) ABSTRACT

Small ceramic particles (e.g., of TiC) are incorporated into fibers. The ceramic particles enhance the friction and/or wear properties of a carbon-carbon composite article made with the impregnated or coated fibers. The impregnated fibers can be, e.g., polyacrylonitrile (PAN) fibers, pitch fibers, and other such fibers as are commonly employed in the manufacture of C-C friction materials. The impregnated fibers can be used to make woven, nonwoven, or random fiber preforms or in other known preform types. Preferred products are brake discs and other components of braking systems. The particles may be included in the fibers by mixing them with the resin employed to make the fibers and/or by applying them to the surfaces of the fibers in a binder.

2 Claims, No Drawings

CARBON FIBER CONTAINING CERAMIC PARTICLES

This application claims priority under 35 USC § 119(e) to U.S. Provisional Applications Nos. 60/661,945 and 60/666,637, which were filed respectively on 16 Mar. 2005 and 31 Mar. 2005. The entire contents of each of Ser. No. 60/661,945 and Ser. No. 60/666,637 is hereby expressly incorporated by reference into the present application.

FIELD OF THE INVENTION

The present invention is in the field of carbon-carbon composite materials. In particular, this invention contemplates carbon-carbon composite materials that are useful as friction components such as brake discs, for instance in aircraft landing system brake assemblies. This invention also provides a method of improving the wear rate of a carbon-carbon composite friction material, by incorporating particulate ceramic (e.g., titanium carbide) into the fibers used to make the carbon-carbon composite materials.

BACKGROUND OF THE INVENTION

Aircraft brakes, which are often made of carbon-carbon composite materials, are subjected to high temperatures, which may change the properties of the carbon and the friction surface and lead to variation in the friction performance of the brake. Other factors that may increase variation in friction performance of carbon-carbon composite materials are variation in the carbon microstructure, variation in the fiber/matrix ratio, and differences in the energy levels of the previous stop or stops performed by the brake. In addition to consistent friction performance, another desirable property of a carbon-carbon friction material is a low wear rate.

It had previously been discovered that titanium carbide, when uniformly distributed into carbon-carbon composite preforms in the form of particles of particular particle size, provides the preforms with beneficially modified friction and wear properties. See U.S. patent application Ser. No. 10/980,033, filed Nov. 3, 2004. The entire disclosure of Ser. No. 10/980,033 is expressly incorporated by reference herein.

The uniform distribution of titanium carbide particles in Ser. No. 10/980,033 contemplates the formation of a fibrous matrix and incorporating titanium carbide powder into the fibrous matrix. However, for example, when manufacturing carbon fiber preforms having needled nonwoven carbon fiber matrices, the preforms are typically carbonized prior to densification. At this point, it is not possible to evenly distribute fine particles of titanium carbide throughout the preform.

SUMMARY OF THE INVENTION

In one embodiment, the present invention incorporates particulate ceramic materials, such as titanium carbide, into the fiber precursor. The ceramic materials contemplated by the present invention are those which improve friction and/or wear properties of the carbon-carbon composite endproduct. Typically, the ceramic materials will be smaller than 8 microns in diameter. Another example of a suitable ceramic material is particulate silicon carbide. It is also contemplated that a ceramic precursor can be used in accordance with this invention. For instance, silica particles may be used, which will be converted to silicon carbide particles in situ.

In another embodiment, the present invention incorporates particulate ceramic materials, such as titanium carbide, into fiber coatings, e.g., into sizing, binders, etc., used in conjunction with the fibers. Virtually any ceramic materials that improve friction and/or wear properties of the carbon-carbon composite endproduct may be utilized in accordance with the present invention. Typically, the ceramic materials will be smaller than 8 microns in diameter. Besides TiC, another example of a ceramic material suitable for use in the present invention is particulate silicon carbide. It is also contemplated that ceramic precursors can be used in accordance with this invention. For instance, silica particles may be used, which will be converted to silicon carbide particles in situ. The present invention contemplates the inclusion of small ceramic particles into fiber sizing and/or binder. The ceramic particles enhance the friction and/or wear properties of a C—C composite article made with the resulting sized fibers and/or with the binder materials. The fibers can be, e.g., polyacrylonitrile (PAN) fibers, pitch fibers, thermoset pitch fibers, etc., and other such fibers as are commonly employed in the manufacture of friction materials. The fibers can be used to make woven, nonwoven, or random fiber preforms or in the manufacture of other known preform types. The final products produced by this invention include brake discs and other components of braking systems.

In manufacturing the fibers to be used in accordance with the first embodiment of the present invention, one mixes the ceramic particles with the fiber precursor, that is, with the carbon or organic polymer that is to be drawn into fiber from that will ultimately be utilized to form the fibrous matrix of the carbon-carbon composite preform.

In order to practice the second embodiment of the present invention, one first mixes the ceramic particles with liquid phase sizing and/or with liquid phase binder material, for example by mixing the components in a mixer. Subsequently, fibrous preform matrices incorporating the sizing and/or binder material prepared in this way are manufactured utilizing standard manufacturing processes, such as those involving chopped random fiber materials or those involving continuous nonwoven materials.

DETAILED DESCRIPTION OF THE INVENTION

The present invention envisages two different approaches to the incorporation of ceramic into the fiber matrix of carbon-carbon composite performs.

This invention provides a carbon-carbon composite brake disc preform comprising carbon fibers and resin binder, wherein the carbon fibers have particulate tough ceramic material—composed of titanium carbide, silicon carbide, or precursors thereof—distributed throughout their mass. These carbon fibers may be present within the preform for instance in the form of needled nonwoven fabric. Preferably, each particle of tough ceramic material is less than 8 microns in diameter. More preferably, the particles are titanium carbide ranging in size from 1 to 2 microns in diameter. The mass fraction of titanium carbide or other ceramic material in the fibers in this aspect of the invention is typically less than 2 percent.

A preform as described above may comprise 15-80, preferably 50-65, weight-% carbon fiber, 20-65, preferably 30-45, weight-% binder, and from 0.5-5, preferably 1-2, weight-% particulate titanium carbide or other tough ceramic material, the ceramic particles being incorporated within the carbon fibers.

A method of making a carbon-carbon composite performs as described above includes the steps of: providing carbon fibers or carbon fiber precursors that contain tough ceramic material particles such as titanium carbide particles therein; combining the carbon fibers or carbon fiber precursors with resinous binder in a mold; and subjecting the combined components to pressure and heat to carbonize the resinous binder, thereby providing a carbon-carbon composite preform having particulate ceramic material uniformly distributed throughout its fibrous matrix.

A carbon fiber or carbon fiber precursor having from 0.5 to 5, preferably 1-2, weight-% particulate tough ceramic material (such as titanium carbide) incorporated within its mass is likewise provided by the present invention. The carbon fiber or carbon fiber precursor can be made by forming a mixture of particulate ceramic material with carbon or synthetic organic polymer material and drawing the mixture through a spinneret.

Another type of preform in accordance with this invention may comprise 15-80, preferably 50-65, weight-% carbon fiber, 20-65, preferably 30-45, weight-% binder, and from 0.5-5, preferably 1-2, weight-% particulate titanium carbide or other tough ceramic material, the ceramic particles being incorporated within sizing of the carbon fibers and/or within the binder.

These preform embodiments of the present invention can be made by: providing carbon fibers or carbon fiber precursors that are sized with tough ceramic material particles such as titanium carbide particles; combining the carbon fibers or carbon fiber precursors with resinous binder in a mold; and subjecting the combined components to pressure and heat to carbonize the resinous binder, thereby providing a carbon-carbon composite preform having particulate ceramic material uniformly distributed throughout its fibrous matrix. Alternatively, they can be made by: providing resinous binder that contains tough ceramic material particles such as titanium carbide particles; combining this resinous binder with carbon fibers or carbon fiber precursors in a mold; and subjecting the combined components to pressure and heat to carbonize the resinous binder, thereby providing a carbon-carbon composite preform having particulate ceramic material uniformly distributed throughout its fibrous matrix.

THE FIBERS. The fibers that may be used in this invention include carbon fibers derived from polyacrylonitrile (PAN), pitch, rayon, and other carbon fiber precursors. One may also use carbon fiber precursors stabilized so that they will not melt and will yield carbon fibers when heated in an inert atmosphere. Thus the short carbon fiber segments or carbon fiber precursor segments to be used in this invention may be selected from the group consisting of oxidized PAN-based carbon fiber, pitch-based carbon fiber, rayon-derived carbon fiber, stabilized pitch fiber, and partially carbonized oxidized PAN fiber. Stabilized pitch fibers and oxidized PAN fibers have been found to be especially convenient carbon fiber precursors. Typical fiber segment lengths range from ¼ inch to 2 inches. Fibers of different lengths may be combined in a single preform in order to impart gradient properties to the preform. Inasmuch as typical spinneret diameters are 6-15 microns, the titanium carbide particles that are incorporated into (or coated onto) fibers in accordance with the present invention are generally 2.0 microns in diameter or less, so that they pass easily through the spinneret when the fibers are manufactured. It has been found, in any case, that the use of titanium carbide particles larger than 5.0 microns may unfavorably impact the wear rate of the friction material. The mass fraction of titanium carbide in the fiber would typically be less than 2%. Further processing of fibers in accordance with this invention is largely conventional. That is, uncarbonized, partially carbonized, or stabilized fibers containing or coated with titanium carbide in accordance with the present invention are made into preforms by processes that are in general known to those skilled in the art.

THE BINDER. As the pitch binder component, this invention contemplates coal tar mesophase, coal tar isotropic (e.g., Koppers Coal Tar Isotropic), synthetic mesophase (e.g., AR Mitsubishi Mesophase), petroleum in mesophase or isotropic form, or any other generally similar pitch. The pitch used in this invention typically has a softening point of 80° C. or higher, preferably above 140° C. Many pitches that can be used in this invention have softening points in the range 100° C. to 200° C. A pitch that is particularly preferred for some application is a mesophase pitch that has a softening point ranging from 285° C. to 320° C. The pitch binder in this invention is generally used in particulate form, with the pitch particle typically ranging in diameter from 50 to 500 microns.

PROCESSING. In accordance with this invention, preforms are made from ceramic particle-containing fibers and binder. This may be accomplished by any convenient method. An overall process that may be used includes the steps of molding titanium carbide-containing fibers (e.g., polyacrylonitrile fibers coated with titanium carbide particles) and binder (e.g., phenolic resin), post-curing the molded preform, charring and heat-treating the cured preform, infiltrating the heat-treated preform with pitch and carbonizing it, then subjecting it to a second heat treatment followed by grinding the inside and outside diameters of the preform into the desired shape. At this point, the shaped preform is subjected to a single Chemical Vapor Deposition (CVD) cycle. Subsequently, it is subjected to final machining, anti-oxidant application, and anti-oxidant charring, to provide e.g. an aircraft landing system brake disc.

The method disclosed in application Ser. No. 10/852,933, filed 25 May 2004, entitled MANUFACTURE OF FUNCTIONALLY GRADED CARBON-CARBON COMPOSITES, may be used in connection with the present invention. In this method, the fibers and pitch binder are combined in a mold, and the materials are then compressed under temperatures that soften or melt the coal tar pitch resin. After compression at elevated temperature for sufficient time, the resin impregnates the matrix formed by the fibers in the mold. The mold is then cooled, still under pressure. Finally the pressure is released and the resin-impregnated fibrous preform is removed from the mold. The loose materials (fibers and binder) in the mold may be e.g. 9 to 10 inches in depth. When a two-piece mold is employed, the loose materials may be contained in one or both sections of the mold (i.e. bottom or top and bottom), depending on the compaction ratio that is employed to obtain a disc/preform at the desired thickness after compaction under temperature and pressure. In the two-piece mold, the compacted material will be totally in the bottom segment of the mold. The bottom segment of the mold will then be used as a constraint fixture, and will have a top cover (compaction plate) locked in place on it. Preforms typically range in thickness from 1 to 3 inches.

The preform is then placed in a constraint fixture and subjected to a rapid carbonization/stabilization cycle of approximately 80 hours without prior oxidative stabilization. This phase of processing may be accomplished, for instance, as disclosed in application Ser. No. 10/764,149, filed 23 Jan. 2004, entitled BINDERLESS PREFORM MANUFACTURE and in application Ser. No. 10/942,258, filed 16 Sep. 2004, entitled FIXTURE FOR HOLDING A PREFORM DURING A HEATING PROCESS. The disclosures of Ser. No. 10/764,149 and Ser. No. 10/942,258 are incorporated by reference herein. Once this stabilization/carbonization cycle is completed, the preform is subjected to additional combinations of densification cycles, including (Vacuum Pitch Infiltration (VPi) followed by carbonization and CVD. Intermediate heat treatment cycles may also be used to enhance densification, and—along with final heat treatment processes—to control material properties.

EXAMPLES

Aircraft stator and rotor brake discs are made from 60 weight-% polyacrylonitrile fibers containing 2 weight-% titanium carbide particles and 40 weight-% phenolic resin binder. The rotors are rotated at 6400 revolutions per minute and then stopped by pressing them against the stators with a force of 500 lbs/in². Typical weight loss and thickness loss experience is as follows:

| | WEIGHT LOSS | | | |
|---|---|---|---|---|
| STOPS | STATOR (lbs) | ROTOR (lbs) | BOTH (lbs) | LOSS (lbs, cumulative) |
| Start | 14.3489 | 14.3420 | 28.6909 | — |
| 20 | 14.2526 | 14.2325 | 28.4851 | 0.2058 |
| 100 | 14.1753 | 14.1674 | 28.3427 | 0.1424 |

| | THICKNESS LOSS | | | |
|---|---|---|---|---|
| STOPS | STATOR (inches) | ROTOR (inches) | BOTH (inches) | LOSS (inches, cumulative) |
| Start | 0.2487 | 0.2495 | 0.4982 | — |
| 20 | 0.2470 | 0.2476 | 0.4946 | 0.0036 |
| 100 | 0.2457 | 0.2470 | 0.4927 | 0.0019 |

What is claimed is:

1. A carbon-carbon composite brake disc comprising carbon fibers and
   mesophase coal tar pitch, isotropic coal tar pitch, or synthetic mesophase pitch,
   wherein said carbon fibers have titanium carbide particles up to 5.0 microns in diameter distributed throughout their mass, and wherein the mass fraction of titanium carbide in the fibers is less than 2 percent.

2. The carbon-carbon composite brake disc of claim 1, wherein the particles of titanium carbide range in size from 1 to 2 microns in diameter.

* * * * *

UNITED STATES PATENT AND TRADEMARK OFFICE
CERTIFICATE OF CORRECTION

| | | |
|---|---|---|
| PATENT NO. | : 7,575,799 B2 | Page 1 of 1 |
| APPLICATION NO. | : 11/375119 | |
| DATED | : August 18, 2009 | |
| INVENTOR(S) | : Fryska et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 502 days.

Signed and Sealed this

Seventh Day of September, 2010

David J. Kappos
*Director of the United States Patent and Trademark Office*